United States Patent
Cohen et al.

(10) Patent No.: US 10,546,304 B2
(45) Date of Patent: Jan. 28, 2020

(54) RISK ASSESSMENT BASED ON LISTING INFORMATION

(71) Applicant: PayPal, Inc., San Jose, CA (US)

(72) Inventors: Yael Cohen, San Jose, CA (US); Guy Ronen, San Jose, CA (US); Ran Yuchtman, Holon (IL); Chen Kovacs, Rishon le Zion (IL)

(73) Assignee: PAYPAL, INC., San Jose, CA (US)

( * ) Notice: Subject to any disclaimer, the term of this patent is extended or adjusted under 35 U.S.C. 154(b) by 216 days.

(21) Appl. No.: 15/637,171

(22) Filed: Jun. 29, 2017

(65) Prior Publication Data
US 2019/0005510 A1  Jan. 3, 2019

(51) Int. Cl.
| G06Q 30/00 | (2012.01) |
| G06Q 30/02 | (2012.01) |
| G06F 16/00 | (2019.01) |

(52) U.S. Cl.
CPC ........ *G06Q 30/0185* (2013.01); *G06F 16/00* (2019.01); *G06Q 30/00* (2013.01); *G06Q 30/0218* (2013.01)

(58) Field of Classification Search
CPC .. G06F 16/00; G06F 30/0218; G06F 30/0185; G06Q 30/00

USPC .......................................................... 726/22
See application file for complete search history.

(56) References Cited

U.S. PATENT DOCUMENTS

| 6,144,934 | A | * | 11/2000 | Stockwell | H04L 29/06 704/1 |
| 8,666,829 | B1 | * | 3/2014 | Bruckhaus | G06Q 30/0609 705/26.1 |
| 2005/0114229 | A1 | * | 5/2005 | Ackley | G06Q 30/0601 705/26.1 |
| 2013/0091578 | A1 | * | 4/2013 | Bisht | G06F 21/53 726/25 |
| 2015/0324737 | A1 | * | 11/2015 | Chrzan | G06Q 30/00 705/28 |
| 2016/0012235 | A1 | * | 1/2016 | Lee | G06Q 10/0635 726/25 |
| 2016/0321336 | A1 | * | 11/2016 | Aharoni | G06F 16/26 |
| 2018/0308159 | A1 | * | 10/2018 | Knijnik | G06Q 40/025 |

* cited by examiner

*Primary Examiner* — Lynn D Feild
*Assistant Examiner* — Dereena T Cattungal
(74) *Attorney, Agent, or Firm* — Haynes and Boone, LLP

(57) ABSTRACT

A system and method for assessing the risk of a listing that transforms information from the listing into variables suitable for a classifier trained to score the riskiness of listings and using the score in addition to predetermined variable constraints to determine whether a listing is fraudulent.

20 Claims, 3 Drawing Sheets

RISK ASSESSMENT BASED ON LISTING INFORMATION

TECHNICAL FIELD

The present disclosure generally relates to risk analysis, and more specifically risk analysis through listing information.

BACKGROUND

Fraudulent listings are a major problem in the online market place. People will use market place services like Amazon, eBay, Alibaba, Taobao, and/or the like to defraud customers of their money. This is a major problem for both the marketplace and payment providers, as the marketplace and/or the payment providers usually absorb the costs of refunding the customers. Furthermore, the brand and reputation of a marketplace can be damaged when there are too many fraudulent listings. Furthermore, fraudulent listings can act like spam that can overrun the legitimate listings, reducing the usability of a marketplace. As such, Applicants recognize that it would beneficial to conduct risk analysis on listings to help determine whether the listing is fraudulent or not.

Figure 1:
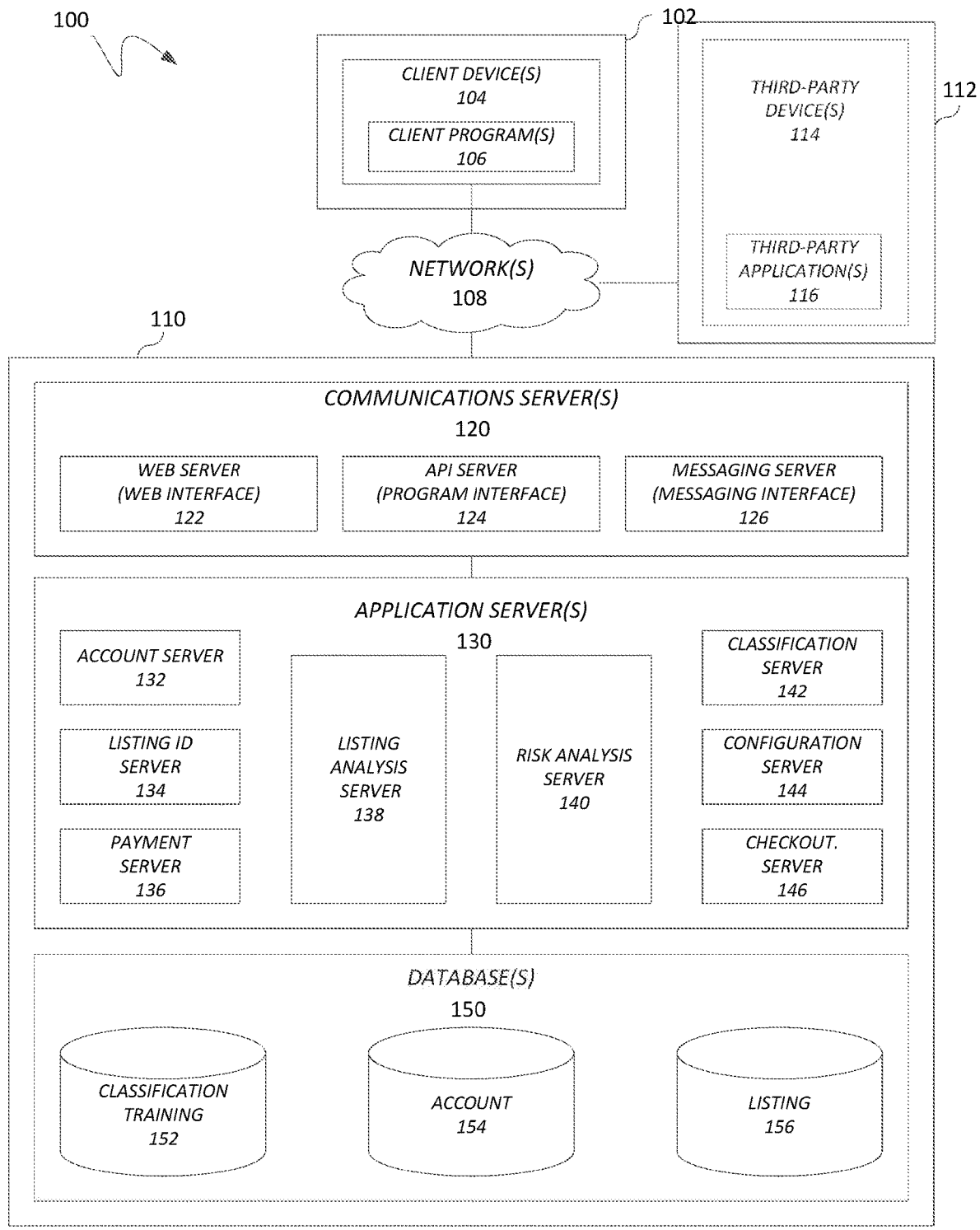
FIG. 1 is a block diagram of an example computing system that is adapted for conducting risk analysis of listings.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

FIG. 1 illustrates, in block diagram format, an example embodiment of a computing system adapted for implementing a system for merchant item identification. As shown, a computing system 100 may comprise or implement a plurality of servers and/or software components that operate to perform various methodologies in accordance with the described embodiments. Example servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party devices 114 hosting third-party applications 116. In various implementations, third-party devices 114 and/or third-party applications 116 may host applications associated with or employed by a third party 112. For example, third-party devices 114 and/or third-party applications 116 may enable network-based system 110 to provide client 102 and/or system 110 with additional services and/or information, such as merchant information, data communications, payment services, security functions, customer support, and/or other services, some of which will be discussed in greater detail below. Third-party devices 114 and/or third-party applications 116 may also provide system 110 and/or client 102 with other information and/or services, such as email services and/or information, property transfer and/or handling, purchase services and/or information, and/or other online services and/or information.

In one embodiment, third-party devices 114 may include one or more servers, such as a listing server, payment provider server, merchant server, and/or the like. In some embodiments, the third-party devices may include a database that can provide information regarding different items and/or services for sale. In yet another embodiment, third-party severs 114 may include one or more servers for aggregating user data, purchase data, listing data, and/or other statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account management, risk management, advice on listings, payment processing, item recognition, checkout processing, data gathering, data analysis, and other services to users that access network-based system 110. In various embodiments, client devices 104 and/or third-party devices 114 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party devices 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various services to clients including, but not limited to, risk analysis, listing analysis, payment processing, authentication, fraud detection and/or the like. Application server 130 of network-based system 110 may provide services to a third party merchants, which may be similar to the services provided to the client such as risk analysis, fraud detection, payment processing, and/or the like. Application servers 130 may include an account server 132, listing identification server 134, payment processing server 136, listing analysis server 138, risk analysis server 140, classification server 142, configuration server 144, and/or checkout server 146. These servers, which may be in addition to other servers, may be structured and arranged to configure the system for risk analysis of listings. In some examples, some of the servers may be combined into a single server.

Application servers 130, in turn, may be coupled to and capable of accessing one or more databases 150 including a classification training database 152, an account database 154, and/or listing database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
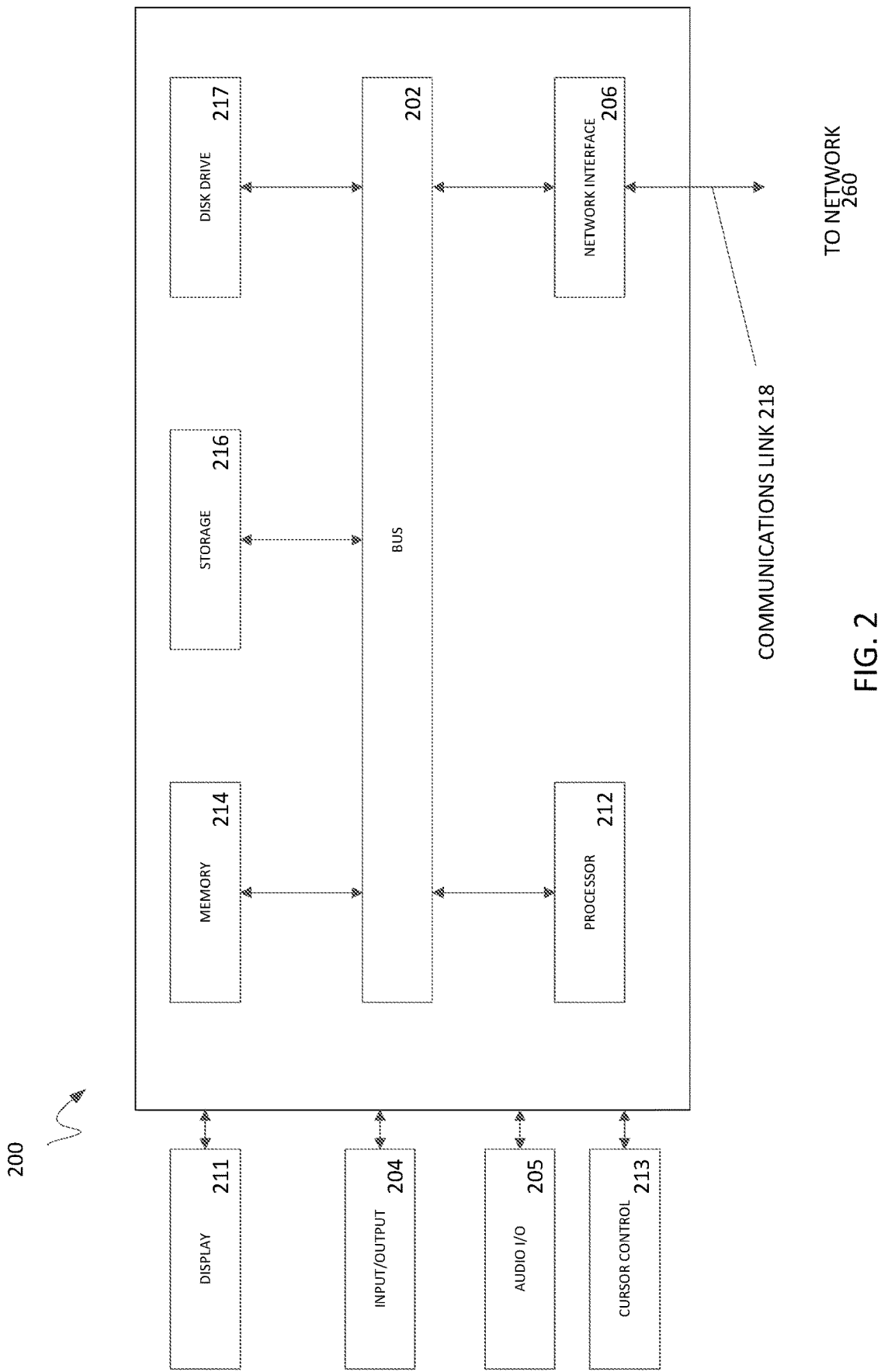
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
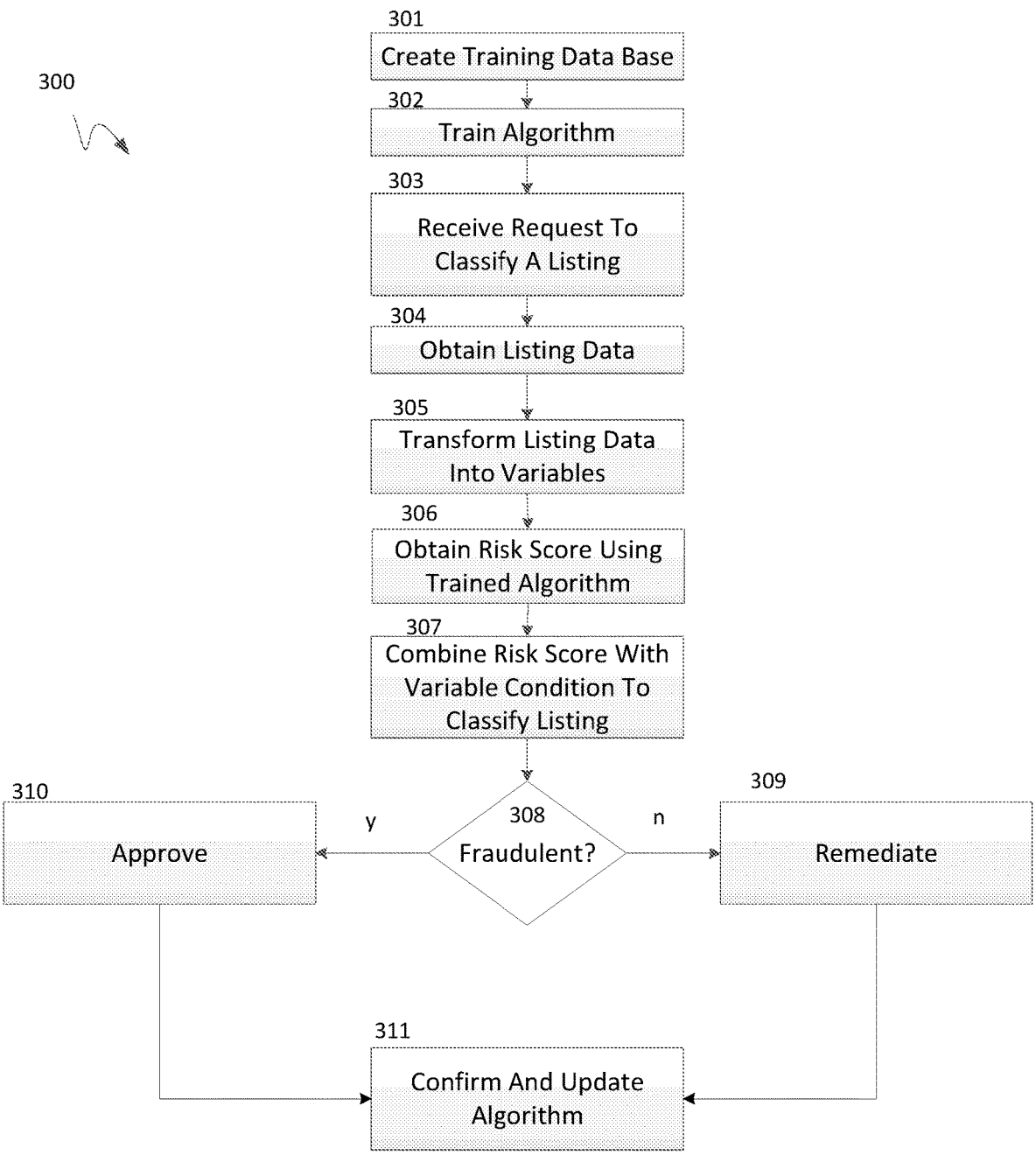
FIG. 3 is a flow diagram illustrating an example process for risk analysis of listings.

FIG. 3 illustrates example listing risk analysis process 300 that may be implemented by a system for determining whether a listing is fraudulent or legitimate. Process 300 may be implemented on a system such as system 100 of FIG. 1 according to some embodiments. According to some embodiments, process 300 may include one or more of operations 301-311, which may be implemented, at least in part, in the form of executable code stored on a non-transitory, tangible, machine readable media that, when run on one or more processors, may cause a system to perform one or more of the operations 301-311.

In some examples, process 300 may include operation 301. At operation 301, the system may set up a training database to train a classification and/or regression algorithm and/or risk assessment algorithm to detect fraudulent listings. In some examples, the database may be filled with listings that have been confirmed as fraudulent or legitimate. In some examples, the listings may be merchant listings for third-party marketplace websites such as eBay®, Amazon®, Alibaba®, Taobao®, and/or the like. In some examples, listing data may be obtained and stored in the database by connecting to the marketplace website and scraping data off merchant listings hosted on the marketplace website. In some examples, certain market places may provide API connections or pipelines that will feed the system listing data. In some examples, the listing data may be received by the server in a structured format. For example, the data may be comma delimited indicating whether some information is related to the title, identifier, comments, and/or other categorizations. In some examples, the system may be configured to obtain the data in an unstructured format. In some embodiments, the system may convert unstructured data that it receives and may structure it based on predetermined configurations. For examples, the system may be configured to use certain data sizes, data received in certain orders, keywords, and/or other data characteristics to structure the unstructured data.

Additionally, the system may receive confirmation as to whether certain listings are fraudulent or not. In some examples, each listing may have an identification number and a third party may provide data indicating whether certain listings turned out as fraudulent or legitimate. For example, a successful purchase from a listing without a support ticket or fraud report within a certain amount of time may cause the system to confirm that the listing was legitimate. Similarly, a ticket or fraud report for a listing may be used as confirmation that the listing is fraudulent. This information may either be obtained or provided to the system. For example, the third-party marketplace may provide the information. In some examples, the system may run the marketplace and be configured to obtain this information. The information may include an identifier associated with the listing such that the system can match the confirmation of fraud or legitimate to the scrapped or obtained listing. In this manner, the system may build a database of real listings that are known as fraudulent or legitimate and can be used to train a classification algorithm to classify new listings.

In some examples, process 300 may include operation 302. At operation 302, the system may train a classification or regression analysis algorithm with the database created in operation 301. In some examples, the system may first transform the data in the database into variables that the classifier is configured to receive. Some variables the system may calculate or determine from the listing data may include but are not limited to number of words in the listing, number of words in all uppercase, the ratio of words that are all uppercase and not, number of words where the first letter is capitalized, number of words where the is capitalization in the middle of the word, length of the title, ratio of capital letters vs not, whether certain words appear (e.g. buyitnow, new, used, latest, preorder, hot, unlocked, etc.), number of spaces, number of numerical values/digits, punctuation, number of a certain punctuation (e.g. question mark, exclamation mark, etc.), number of characters that are not alphanumeric, ratio of not alphanumeric letters to alpha numeric letters, sentiment of the title (negative or positive), listing identifier, listing category, shipping options, shipping type, shipping time, handling time, shipping fee, accepts returns, length that the listing has been live, product identifiers, how close the listing is to default preferences of the merchant site, country, number of available items, price, item condition, IP address of the seller, price gap from average or other listings, payment types accepted, whether the listing account has had fraudulent listings before, number of listings for an account, number of successful sales for the listing account, and/or the like.

The system may then use the training data to train a classification algorithm, such as random forest, to classify the listings as fraudulent or legitimate based on the given variables and the associated confirmation labels of legitimate or fraudulent.

Process 300 may include operation 303. At operation 303 the system may receive a request to classify a listing. In some examples, the system may classify listings as new listings are found or fed to the system through an API of the marketplace. The system may be configured to treat each new listing as a request for classification.

In some examples, the system may be configured to receive listing identifiers and/or links as part of a request to classify a listing. The system may receive the request as part of a checkout or purchase request and review the listing to assess risk of the purchase. For example, a payment provider system may request a classification of the listing as part of a payment denial/confirmation risk assessment. In this manner, the system does not waste resources assessing and/or analyzing listings that are ignored, unviewed, and/or without a sale.

In some examples, the system may be configured to receive requests from users of the listing service to provide confidence that the listing is not fraudulent. For example, a user may see a listing for a product that they would like to purchase, but may wonder if the listing is legitimate. For example, users may be wary of items that are priced unusually low, have unfamiliar formatting, from a foreign country, new user, and/or the like. As a safe guard users may request a fraud check from the system to analyze the listing.

Process 300 may include operation 304. At operation 304, the system may obtain listing data from the listing associated with the request at operation 303. In some examples, the listing data may be provided to the system as part of the request in operation 303. In some examples, the system may obtain the data through an API. For example, some listing marketplaces provide APIs from which the system can query for data regarding a listing. In some examples, the system may provide a listing identifier and in response receive data associated with the identified listing through the API.

In some examples, the system may scrape the listing data off the webpage. For example, the system may determine the URL of the listing based on the listing identifier. In some examples, the system may receive the URL as part of the request in operation 303. The system may then scrape the data from the webpage of the listing and store it in a database.

Process 300 may include operation 305. At operation 305 the system may take the data of the listing obtained in operation 304 and transform the data to forms suitable for input into the classification algorithm in operation 302, such as the variables discussed in operation 302 (e.g. number of capital letters, punctuations, etc.).

Process 300 may include operation 306. At operation 306, the system may input the determined variables for the listing in operation 305 into the algorithm trained in operation 302 and determine a risk score. The trained algorithm may provide a classification of the listing and/or a confidence score and/or classificatoin. For example, in the case where there the algorithm is a random forest algorithm, the score may be the average of the determinations and/or scores of the decision trees within the random forest algorithm. The classification may be based on the average score and/or based on the outcome that a majority of decision trees within the random forest produced.

As an example, the decisions trees may output a 0 for legitimate and 1 for fraudulent. If the average score of the decision trees is 0.51 (slightly more than half of the decision trees output 1), then the system can tell that more than half the decision trees indicated that the listing was fraudulent based on the variables received and the trained algorithm. In some examples, this may be a binary classification of 1 (fraudulent), but the risk score, which may be based on the average, may provide a more granular understanding of the classification. Such as, in this example, although the random forest classified the listing as fraudulent, it was a close call.

In some examples, the threshold for classifying whether a listing is fraudulent or not may be at another threshold rather than majority, such as at 70%.

Process 300 may include operation 307, at operation 307, the system may combine the risk score and/or classification determined at operation 306 with one or more predetermined conditions to determine whether the system is going to take an action and/or consider the listing fraudulent. For example, the system may have certain criteria, in addition to the risk score and/or classification from the classification algorithm, for a listing to be treated as fraudulent.

In some examples, the criteria may be based on the one or more transformed variables at operation 305. For example, a threshold number of words that are using all capitalized letters, country of origin, shipping length, age of the account, prior fraudulent actions, number of sales, price, and/or the like. In some examples, there may be one or more criteria in combination with the risk score determine at operation 306. For example, a certain threshold risk value from operation 306 (e.g. 0.51 average out of 1) and account age less than a year or sales under 5 could result in a fraud determination. There may be multiple, for example, in addition to the previous example, another route to may be a 0.81 average out of 1 and 20 non-alphanumeric characters for a fraudulent determination. Another route for the system to determine a listing as fraudulent could be a 0.30 average risk value determined in operation 306 that is also an account made within a week and with zero sales. As such a predetermined combination of risk scores and variable conditions may be used to cause the system to make a fraud determination. The variable conditions can be provided or configured into the system and determined heuristically. In this manner, a user of the system would be able to adjust and fine tune the system to a desired risk profile. Additionally, allowing for user configured systems would help course correct the algorithm in operation 302 quicker.

By combining the one or more user conditions based on the variables and/or other data points and the risk score determined at operation 306, the system may determine whether the listing is fraudulent or legitimate at operation 308.

If the system determines that the listing is fraudulent at operation 308, the system may continue to operation 309. At operation 309, the system may conduct one or more remediation procedures due to the fraudulent determination. In some examples, the system may report the findings to the listing provider, such as the listing marketplace. In some examples, the system may work with the listing provider and cause the listing to be removed. In some examples, the system may remove the listing or delist the listing. In some examples, the system may request additional information from the listing account, such as additional proof that the listing is legitimate before letting the listing be available on the listing site, relisting the listing, and/or allow a purchase to go through. Additional proof may be a request for an image of the product, proof of purchase, shipment of the product to a warehouse as escrow and proof. In some examples, the system may not immediately release funds to the listing account from a purchaser for the object in the listing until there is confirmation that the purchaser has received the correct item of purchase. In some examples, the system may delay the ability for the listing account from withdrawing funds, such that a refund can be made if the listing turns out to be fraudulent. In some examples, the system may deny or prevent a purchase from the listing.

In some examples, the system may update the algorithm of operation 302 if the listing turns out to be confirmed legitimate. For example, when a product purchase is confirmed complete without issues for a predetermined time. Additionally, the system may update the algorithm and reinforce that these types of listings are fraudulent when the system confirms that this listing is fraudulent. For example, if a purchase goes through, but the system has to conduct a refund, and/or if the account is unwilling to go through additional steps to prove that it is not fraudulent.

If the system determines that the listing is legitimate, the system may continue to operation 310. At operation 310, the system may perform one or more actions associated with the legitimate determination. For examples, the system may inform the requester of the legitimate status. In some examples, the system may approve purchases, payment, and/or the publication of a listing.

Furthermore, the system may include operation 311. In some examples, the system may continue from operation 309 or 310 to operation 311 and update the algorithm in operation 302 upon confirmation that the listing is legitimate or fraudulent. For example, if a purchase is conducted through the listing without issue in a predetermined amount of time, they system may confirm that the listing was legitimate. In contrast, if there is a refund request and/or a report of some sort that the listing was fake, the system may use this as confirmation that the listing was fraudulent. With the confirmation, the listing data and confirmation may be provided as part of the training database in 301 to retrain and/or update the classification algorithm in operation 302. Although process 300 is described with operations 301-311, one or more of those operations may be merged, omitted, and/or be in addition to other processes not described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on listings hosted by a third-party provider; however, a federated listing option may be available in the future. Also, payment does not have to involve a purchase, but may be a loan, a charitable contribution, a gift, etc. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
  a non-transitory memory storing instructions; and
  one or more hardware processors coupled to the non-transitory memory and configured to execute the instructions from the non-transitory memory to cause the system to perform operations comprising:
    connecting to a listing webpage of a merchant site;
    scraping listing data from the listing webpage;

transforming the scraped listing data into variables for a listing risk classifier;
inputting the variables into the listing risk classifier, the listing risk classifier trained using known fraudulent and legitimate listings;
determining a risk value from the listing risk classifier;
determining that the listing webpage is fraudulent based on the risk value and at least one predetermined threshold value for at least one of the variables;
receiving a user selection, wherein the user selection includes a confirmation label for the listing webpage that confirms the listing webpage as legitimate or fraudulent; and
training the listing risk classifier based on the risk value, the variables, and the confirmation label.

2. The system of claim 1, wherein at least one of the variables is a ratio of words in uppercase to lowercase.

3. The system of claim 1, wherein at least one of the variables is a number of a particular word appearing in the listing.

4. The system of claim 1, wherein at least one of the variables is based on punctuation marks.

5. The system of claim 1, wherein at least one of the variables is based on an identifier of a product in the listing.

6. The system of claim 1, wherein the listing risk classifier is based on a random forest algorithm.

7. The system of claim 1, wherein the operations further comprise preventing a purchase based on determining that the listing webpage is fraudulent.

8. A computer implemented method, comprising:
connecting to a listing webpage of a merchant site;
scraping listing data from the listing webpage;
transforming the scraped listing data into variables for a listing risk classifier;
inputting the variables into the listing risk classifier, the listing risk classifier trained using known fraudulent and legitimate listings;
determining a risk value from the listing risk classifier;
determining that the listing webpage is fraudulent based on the risk value and at least one predetermined threshold value for at least one of the variables;
receiving a user selection, wherein the user selection includes a confirmation label for the listing webpage that confirms the listing webpage as legitimate or fraudulent; and
training the listing risk classifier based on the risk value, the variables, and the confirmation label.

9. The computer implemented method of claim 8, further comprising reporting the determination that the listing webpage is fraudulent to the merchant site.

10. The computer implemented method of claim 8, further comprising denying a payment authorization based on determining that the listing webpage is fraudulent.

11. The computer implemented method of claim 9, further comprising: receiving a user request for a listing risk analysis; and
reporting to a user device the determination that the listing webpage is fraudulent.

12. The computer implemented method of claim 8, wherein the confirmation label confirms that the listing webpage as legitimate and the determination that the listing webpage is fraudulent as incorrect.

13. The computer implemented method of claim 12, wherein the confirmation label confirms the listing webpage as legitimate, and wherein the method further comprises requesting additional proof that the listing webpage is legitimate.

14. A non-transitory computer-readable medium having stored thereon instructions executable by a computer to cause the computer to perform operations comprising:
connecting to a listing webpage of a merchant site;
scraping listing data from the listing webpage;
transforming the scraped listing data into variables for a listing risk classifier;
inputting the variables into the listing risk classifier, the listing risk classifier trained using known fraudulent and legitimate listings;
determining a risk value from the listing risk classifier;
determining that the listing webpage is fraudulent based on the risk value and at least one predetermined threshold value for at least one of the variables;
receiving a user selection, wherein the user selection includes a confirmation label for the listing webpage that confirms the listing webpage as legitimate or fraudulent; and
training the listing risk classifier based on the risk value, the variables, and the confirmation label.

15. The non-transitory computer-readable medium of claim 14, wherein the operations further comprise delisting the listing webpage in response to the determining that the listing webpage is fraudulent.

16. The non-transitory computer-readable medium of claim 15, wherein the confirmation label confirms the listing webpage as legitimate, and wherein the operations further comprise requesting, from a user device, additional proof that the listing webpage is legitimate.

17. The non-transitory computer-readable medium of claim 16, wherein the operations further comprise relisting the listing webpage in response to receiving additional proof that the listing webpage is legitimate.

18. The non-transitory computer-readable medium of claim 17, wherein the additional proof is an image.

19. The non-transitory computer-readable medium of claim 16, wherein the operations further comprise updating the listing risk classifier in response to receiving the additional proof.

20. The system of claim 1, wherein the user selection further includes an indication of a successful transaction associated with the listing webpage, and wherein the training the listing risk classifier is further based on the indication.

* * * * *